Aug. 21, 1956 J. A. ERICKSON 2,759,591
ADJUSTABLE PORTABLE ELEVATOR
Filed July 26, 1952 2 Sheets-Sheet 1
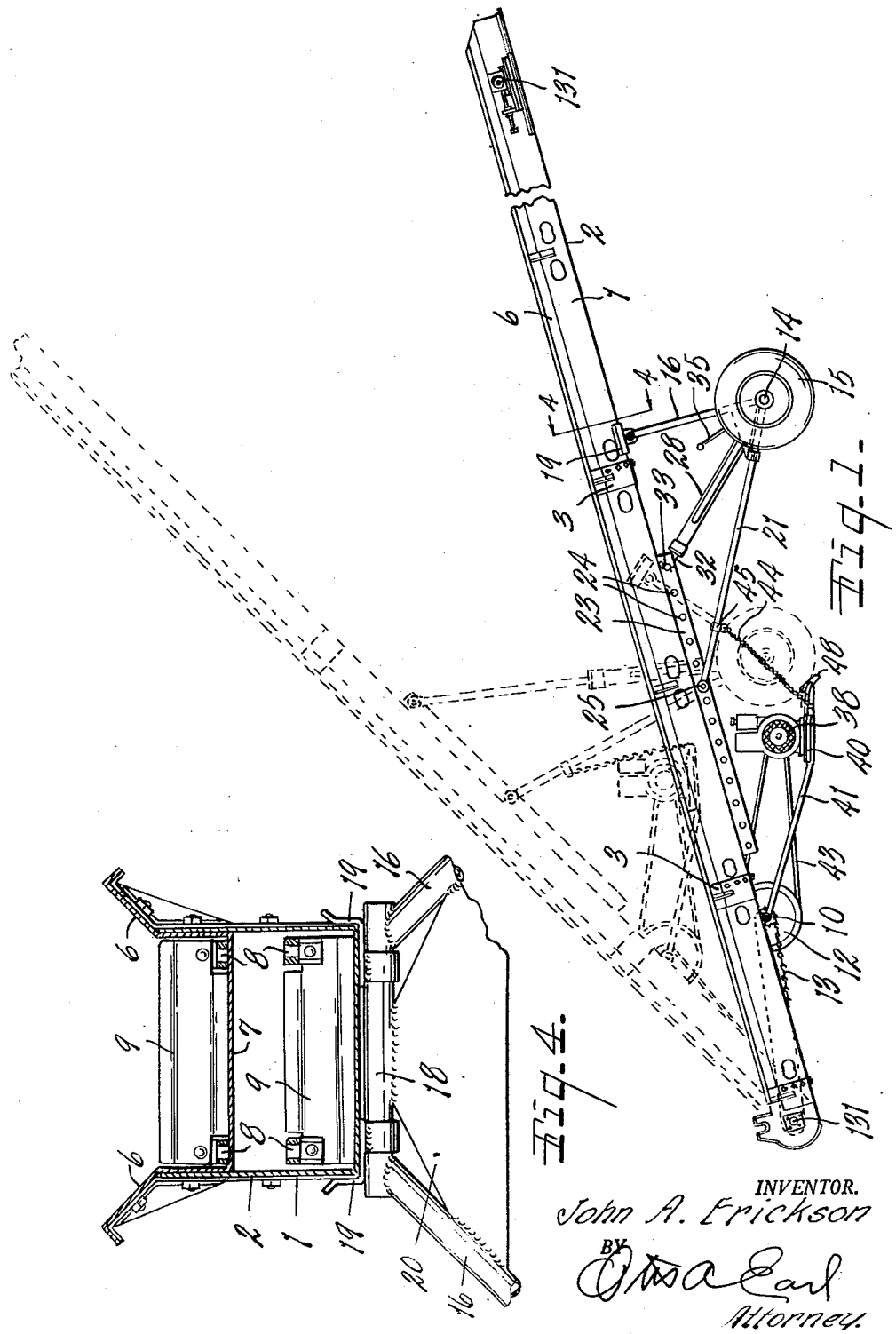
INVENTOR.
John A. Erickson
BY
Attorney.

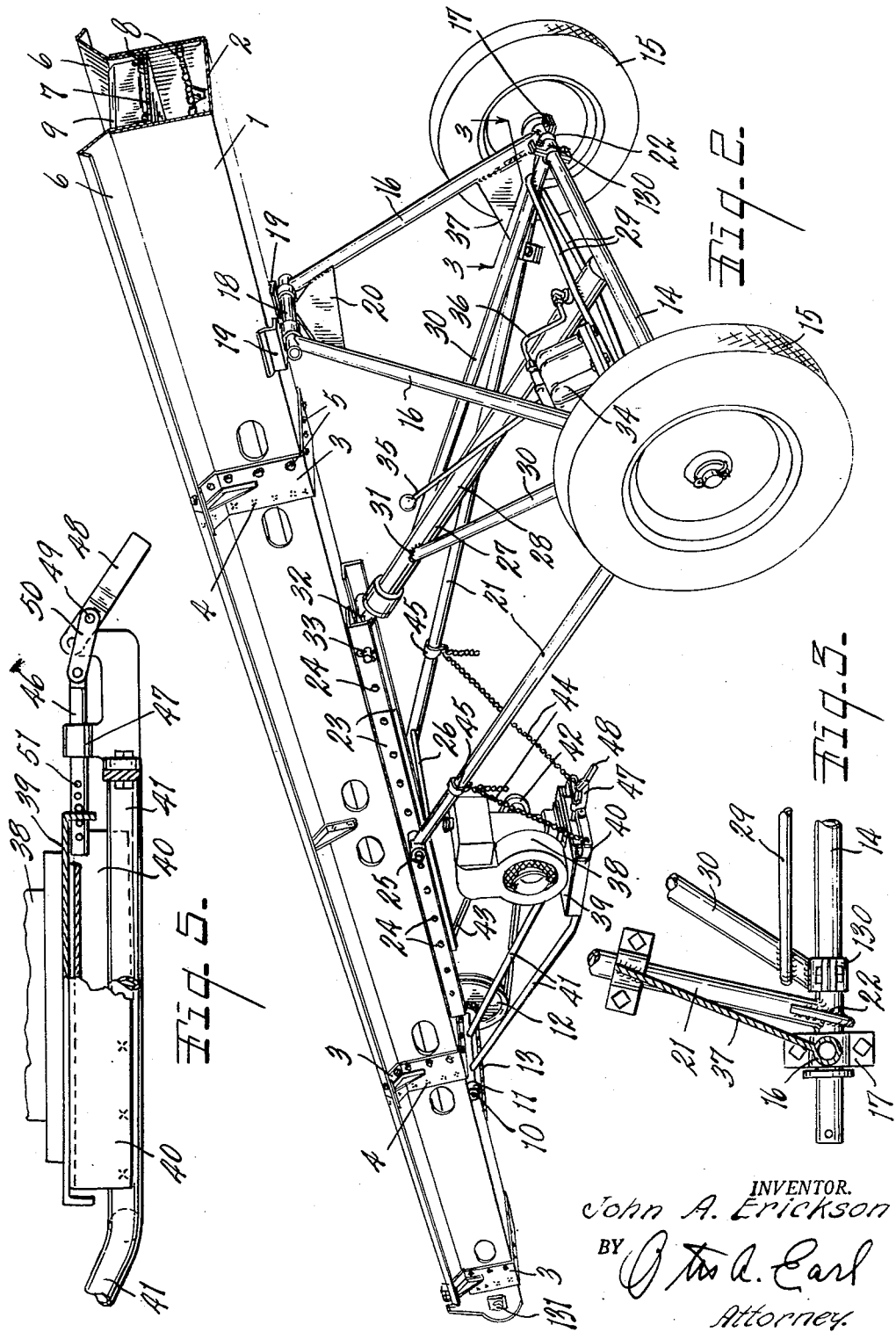

United States Patent Office 2,759,591
Patented Aug. 21, 1956

2,759,591

ADJUSTABLE PORTABLE ELEVATOR

John A. Erickson, Manhattan, Kans., assignor to Viking Manufacturing Company, Manhattan, Kans.

Application July 26, 1952, Serial No. 301,079

5 Claims. (Cl. 198—122)

This invention relates to improvements in portable elevator.

The main objects of this invention are:

First, to provide a portable tiltable elevator which is substantially balanced in any position of its tilting adjustment from its lowered position to its position of highest elevation and intermediate positions.

Second, to provide a portable elevator of large capacity, which, owing to its being substantially balanced in any position of adjustment, may be manually manipulated to position it for any particular work.

Third, to provide a portable elevator structure in which the conveyor may be extended or reduced in length and the supporting parts adjusted to maintain the balance.

Fourth, to provide a structure embodying these advantages which is comparatively simple in its parts and at the same time one which is strong and durable.

Objects relating to details and economies of the invention will appear from the description to follow. The invention is defined and pointed out in the claims.

A preferred embodiment of the invention is illustrated in the accompanying drawing, in which:

Fig. 1 is a fragmentary side elevational view of the elevator embodying my invention shown in its lowered position by full lines and in its elevated position by dotted lines.

Fig. 2 is an enlarged fragmentary rear perspective view with the conveyor in its lowered position.

Fig. 3 is an enlarged fragmentary view on a line corresponding to line 3—3 of Fig. 2.

Fig. 4 is an enlarged fragmentary view on a line corresponding to line 4—4 of Fig. 1.

Fig. 5 is an enlarged fragmentary view partially in vertical section showing details of the engine mounting and the belt tightening features thereof.

The embodiment of my invention illustrated is especially designed for farm use, although it may be used for various other purposes. In the embodiment illustrated the conveyor designated generally by the numeral 1 comprises an upwardly facing channel shaped body or trough 2 formed of sections disposed end to end and connected by U-shaped couplings 3 which are welded at 4 to the outer ends of the sections, and attached to the adjacent sections by means of bolts indicated at 5. The trough or body has outwardly diverging flanges 6 preferably formed integrally with the way 7. The conveyor chains 8 are provided with spaced flights 9. These are supported by sprockets. The sprockets are not illustrated as they form no part of this invention. The driving shaft 10 is mounted in bearings 11 adjacent the front end of the conveyor and is provided with a pulley 12 connected by the sprocket chain 13 to the shaft 131.

The axle 14 is of a length substantially exceeding the width of the conveyor and is provided with carrying wheels 15, desirably rubber tired. A pair of upwardly converging upright strut members 16 are fixedly secured to the axle at 17 (see Fig. 3). These strut members 16 are connected at their upper ends by the cross bar 18 to which a pair of upwardly facing saddle members or rests 19 are secured to receive the conveyor when in its lowered position as illustrated in Fig. 2. The strut members are braced and further connected to the cross piece 18 by means of the gussett plate 20. A pair of forwardly converging tension rods or members 21 are fixedly secured to the axle at 22 on the inner sides of the upright or strut members 16. The tension members are adjustably connected to the conveyor through the support bars 23 fixedly secured on the under side thereof and provided with longitudinal series of holes 24 with which the pivot pins or bolts 25 on the upper ends of the tension members may be selectively engaged. The tension members are connected at their upper ends by the cross bar 26.

The plunger of the hydraulic ram, designated generally by the numeral 27, comprises a cylinder 28 which is secured to the cross member 29 carried by the forwardly converging bars 30 connected to the cylinder at 31 and swingably or rotatably mounted on the axle at 130. The ram plunger 32 is adjustably secured to the support bars by the pivot rod 33. It is pointed out that the strut members 16 are considerably shorter than the tension rods 21 and are fixed thereto at an acute angle so that the conveyor 1 forms an acute and approximately right triangle with the strut and rods when resting on the strut in fully lowered position. The ram plunger 32, hereinafter described, is connected to the conveyor between the points of connection of the conveyor to the rods 21 and the strut 16. This means that the ram is necessarily longer than the strut 16 and shorter than the tension rods 21 in the collapsed position of the ram. Since the ram will extend to almost double its collapsed length it can be made over twice as long as the strut and longer than the tension rods. The distance between the points of connection of the conveyor with the tension rods and the ram is less than the length of the ram and less than one half the length of the tension rods. As a result the rods and the collapsed ram form an obtuse triangle with the conveyor.

The pump 34 is provided with a handle 35 and is connected to the cylinder 28 by the conduit 36. The details of the ram and the connection for the pump thereto are not illustrated. The pump is mounted on the cross member 29 so that its position relative to the cylinder is maintained at all times. The tension rods 21 are bracingly connected to the strut members 16 by the gusset plates 37. When the conveyor is in its lowered position it rests upon the strut or upright as is illustrated in Fig. 2 so that there is no load upon the ram. When it is desired to lift or raise the elevator the pump is operated and the elevator may be raised at any position between its lowered position and its maximum raised position.

The elevator is powdered from an internal combustion engine 38 which is mounted on the slidable portion 39 of the base 40. The base 40 has forwardly projecting arms 41 pivotally mounted on the drive shaft 10. The pulley 42 on the engine shaft, not illustrated, is connected by the belt 43 to the pulley 12 on the drive shaft. The base is supported by the flexible hanger chains 44 attached to the clips 45 on the tension members 21. The adjustable base member 39 is slidably mounted and is adjusted by means of the rod 46 slidable in the bracket 47 and connected to the lever 48 pivoted at 49 by the link 50. The rod 46 has a longitudinal series of pin receiving holes 51 facilitating the adjustable connection of the rod 46 to the base slide member. The connection of the flexible hangers to the tension members maintains the base in its horizontal position as the conveyor is raised and lowered, the effect being to lengthen and shorten the hanger connection.

The supporting and balancing axle and its connection to the conveyor are such that the elevator is in substantial balance when in its lowered position and rests on the carrying strut or upright. This relieves the ram of the load in transportation and provides a very effective balancing support for the elevator as it is being transported. This substantial balance is maintained when the elevator is adjusted to its highest position and to intermediate positions.

It will be noted by reference to Fig. 1 that the axle on which the parts are mounted moves forward when the elevator is raised which of course moves the rear end of the elevator forwardly. Owing to the connection of the motor base to the tension rods the center of gravity of the engine unit likewise moves forwardly. The hydraulic rams and the tension rods are coupled to the support bars 23 for the maximum length of the conveyor in the embodiment illustrated. In the event the conveyor is shortened the connection of these parts to the support bars is adjusted to secure the desired balance when the conveyor is in lowered position, and this balance is maintained through the range of tilting adjustment. With the parts thus arranged the elevator may be manually moved about, that is, the balancing relieves the operator of the load so that it is largely a matter of pushing or pulling the elevator to position for the desired work.

I have illustrated and described my invention in a highly practical embodiment thereof. I have not attempted to illustrate or describe other adaptations or embodiments such, for example, as details in the conveyor proper as it is believed this disclosure will enable those skilled in the art to embody or adapt my invention as may be desired.

Having thus described my invention, what I claim as new and desire to secure by Letters Patent is:

1. A portable elevator comprising a conveyor, an axle of a length substantially exceeding the width of the conveyor, carrying wheels on said axle, a strut comprising upwardly converging strut members fixedly secured to said axle at the inner sides of the wheels, a cross bar connected to the upper ends of said strut members, upwardly facing rests on said cross bar adapted to supportingly receive the conveyor when it is in its lowered position, support bars for said conveyor disposed in laterally spaced relation and having longitudinal spaced aligned holes, forwardly converging tension rods fixedly secured to said axle adjacent the ends thereof and provided with coupling pins engageable with selected holes in said support bars, a hydraulic ram comprising a cylinder disposed centrally of the axle and swingably connected thereto, and a coacting plunger provided with a coupling pin engageable with selected holes in said support bars at a point spaced from said strut and said rods and on the same side of said strut as said rods, a manually operated pump carried by said axle and operatively associated with said cylinder, the connections for said tension rods and said hydraulic ram to said support bars acting to swing the axle forwardly to raise the conveyor and rearwardly to lower it, the conveyor and parts carried thereby being substantially balanced on the axle in any adjusted position thereof at its lowered position and its elevated position and in intermediate positions thereof.

2. A portable elevator comprising a conveyor, a driving shaft mounted on said conveyor adjacent its front end, an axle of a length substantially exceeding the width of the conveyor, carrying wheels on said axle, a strut comprising upwardly converging strut members fixedly secured to said axle at the inner sides of the wheels, a cross bar connected to the upper ends of said strut members, upwardly facing rests on said strut members adapted to supportingly receive the conveyor when it is in its lowered position, support bars for said conveyor disposed in laterally spaced relation and having longitudinally spaced aligned holes, forwardly converging tension rods fixedly secured to said axle adjacent the ends thereof and provided with coupling pins engageable with selected holes in said support bars, a hydraulic ram comprising a cylinder disposed centrally of the axle and swingably connected thereto, and a coacting plunger provided with a coupling pin engageable with selected holes in said support bars at a point spaced from said strut and said rods and on the same side of said strut as said rods, a manually operated pump carried by said axle and operatively associated with said cylinder, an engine provided with a supporting base having forwardly projecting arms pivotally mounted on said driving shaft, flexible hangers for said engine base connected to said tension rods, and a pulley on said driving shaft having belt driving connection with said engine.

3. A portable elevator comprising a conveyor, a driving shaft mounted on said conveyor adjacent its front end, an axle, carrying wheels on said axle, a tension member connected to said axle and to said conveyor, a hydraulic ram carried by said axle connected to said conveyor to coact with said tension member for raising and lowering the conveyor, a support member on said axle coacting with said tension member in its lowered position to support the conveyor with the ram in its retracted position, an engine disposed in front of said tension member and provided with a supporting base having its forward end pivotally mounted on said conveyor adjacent said driving shaft, flexible hangers for the rear of said engine base carried by said tension rods, a pulley on said driving shaft having belt driving connections with said engine, the connections for said tension member and hydraulic ram to said conveyor being positioned in spaced relationship from each other and forwardly of said support member and the point of engagement of the support member with the conveyor and acting to move the axle forwardly and rearwardly as the conveyor is tiltably adjusted, the parts carried thereby being substantially balanced when the conveyor is in lowered position, the travel of the axle relative to the conveyor in the tilting thereof maintaining the balance of the conveyor in its tiltably adjusted position.

4. A portable elevator comprising a conveyor, an axle, carrying wheels on said axle, an inextensible tension member connected to said axle and connected to said conveyor, a hydraulic ram carried by said axle and connected to said conveyor to coact with said tension member for raising and lowering the conveyor, a support member on said axle coacting with said tension member in its lowered position to support the conveyor with the ram in its retracted position, an engine disposed in front of said tension members and provided with a supporting base, swingably connected to conveyor, a hanger for said engine base carried by said tension member, the connections for said tension member and hydraulic ram to said conveyor being positioned in spaced relationship from each other and forwardly of said support member and the point of engagement thereof with said conveyor and acting to swing the axle forwardly and rearwardly as the conveyor is tiltably adjusted, and the parts carried thereby being substantially balanced when the conveyor is in lowered position, the travel of the axle relative to the conveyor in the tilting thereof maintaining the balance of the conveyor in its tiltably adjusted positions.

5. A portable elevator comprising a conveyor, a driving shaft mounted on said conveyor adjacent its front end, an axle, carrying wheels on said axle, means for tiltably supporting said conveyor on said axle including a support for said conveyor in its fully lowered position in which position the conveyor and the parts carried thereby are substantially balanced, means for tiltably raising and lowering said conveyor including a rearwardly and downwardly inclined tension member connected between said conveyor and axle for moving the axle forwardly relative to the conveyor as the conveyor is raised and rearwardly as the conveyor is lowered to substantially maintain the balance of the conveyor on said axle, an engine disposed in front of said axle provided with a horizontally disposed supporting base having its forward end pivotally mounted on said conveyor adjacent the axis of said driving shaft, a hanger for the rear of said base carried by said tension member below said conveyor, a pulley on said driving shaft, and driving connections for said pulley to said engine.

References Cited in the file of this patent

UNITED STATES PATENTS

| | | |
|---|---|---|
| 2,251,667 | Ehinger | Aug. 5, 1941 |
| 2,446,472 | Graf | Aug. 3, 1948 |
| 2,501,332 | Heer | Mar. 21, 1950 |
| 2,528,917 | Slocum | Nov. 7, 1950 |
| 2,604,203 | Neighbour et al. | July 22, 1952 |
| 2,615,560 | Robinson | Oct. 28, 1952 |
| 2,621,777 | Tintes | Dec. 16, 1952 |

FOREIGN PATENTS

| | | |
|---|---|---|
| 409,537 | Italy | Feb. 20, 1945 |